Sept. 4, 1956 R. W. SHOLLE 2,761,957
ELECTRICAL ARC WELDING AND TOOL THEREFOR
Original Filed March 12, 1952 2 Sheets-Sheet 1
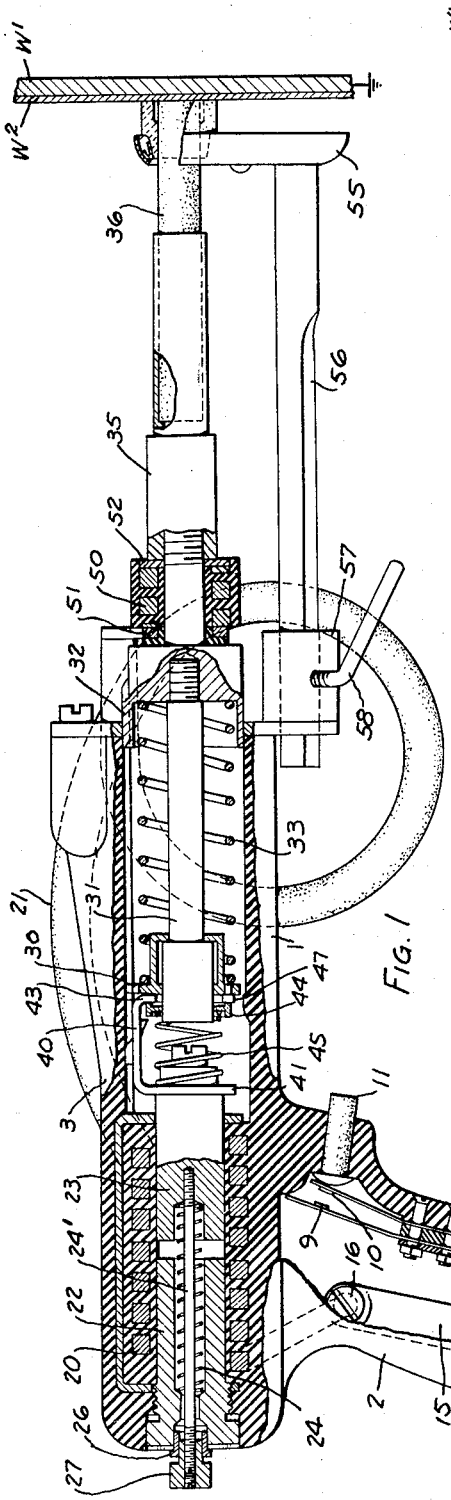
INVENTOR.
ROGER W. SHOLLE
BY
Clyde H. Haynes
ATTORNEYS Sept. 4, 1956   R. W. SHOLLE   2,761,957
ELECTRICAL ARC WELDING AND TOOL THEREFOR
Original Filed March 12, 1952   2 Sheets-Sheet 2

INVENTOR.
ROGER W. SHOLLE
BY
Clyde H. Haynes
ATTORNEYS.

United States Patent Office 2,761,957
Patented Sept. 4, 1956

2,761,957

ELECTRICAL ARC WELDING AND TOOL THEREFOR

Roger W. Sholle, Lorain, Ohio, assignor to Gregory Industries, Inc., Detroit, Mich., a corporation of Michigan Original application March 12, 1952, Serial No. 276,079. Divided and this application May 3, 1954, Serial No. 427,853

7 Claims. (Cl. 219—130)

This invention relates to the art of welding metallic work pieces and it has to do particularly with a form of electrical arc welding. This is a divisional application of Roger W. Sholle's patent application; Serial No. 276,079; filed March 12, 1952; subject: Electrical Arc Welding and Tool Therefor.

One of the objects of the invention is to weld unite metallic work pieces by operating from only one side thereof. Accordingly the opposite side of the work may be inaccessible. An example of such a situation is where one metallic plate is disposed upon the surface of or against an underlying plate, and access to the work is only available or is only convenient from the exposed side of the first mentioned plate. Of course, the work pieces do not neccessarily have to be in the form of plates.

In carrying out one phase of the invention a non-consumable electrode is applied to the exposed face of one of the work pieces, and the underlying work piece may be grounded. Upon the establishment of the circuit, which is made feasible by the contact of the electrode with one work piece, the electrode is retracted from the work piece to thereby establish a gap and draw an arc which occurs between the electrode and the surface of the adjacent work piece. The electrode may be of relatively small cross dimensions with the result that the metal of the work is heated in an area which may be termed a spot, and the two work pieces are thus weld united at a spot, or spot welded, so to speak, the area of which, in a general way, may be controlled as will presently appear. The time period for the arc is determined in accordance with the voltage and current settings and the nature of the work pieces, and when the arc has been established for the determined time period, the electrical circuit is broken and the arc thus discontinued. The welded metal cools almost instantly to complete the spot weld.

In welding as above described the space between the work and the electrode is confined, and thus the arc is confined and protected from ambient atmosphere. Preferably the arc is relatively closely confined and thus a non-oxidizing condition is maintained in and around the immediate vicinity of the arc and the heated metal. In terming the electrode as one which is not consumed in the process, the thought to be conveyed is that the material of the electrode is not consumed in the sense that it does not become a part of the weld.

The welding method of the present invention may be carried out by a tool which may commonly be termed a welding gun and which is arranged to be manipulated to apply the electrode to the work and to retract it and maintain the electrode in retracted position during the welding action and to hold the welding electrode thus retracted until after the tool has been removed from the work. The tool of the present invention may be employed in the tack welding of interfaces of work pieces wherein the interfaces extend generally in the direction of extent of the electrode of the tool. This may occur where the edges of work pieces are tack welded together and the tool may be applied to the work piece so that the electrode is disposed substantially at the crack between the work pieces.

A further object of the invention is to provide a tool wherein welding may be accomplished by the employment of a consumable electrode and wherein the material of the electrode is deposited in the weld metal of the work piece. In this connection, the metal of the electrode may be deposited upon the surface of a work piece without necessarily welding said work piece to another work piece. In this latter event the metal of the electrode may be deposited at spaced locations on the work piece to thereby produce a roughened surface.

The accompanying drawings demonstrate the welding procedure and disclose a tool for performing the welding method.

Fig. 1 is a view of a welding gun with parts cut away and some parts in section showing the same applied to superimposed work pieces.

Fig. 2 is an enlarged sectional view demonstrating a catch or holding device for holding the electrode retracted.

Fig. 3 is a sectional view showing the electrode retracted from the work at the time the electric arc is established.

Fig. 4 is a view illustrating the normal position of the electrode showing how it projects from the confining device.

Figure 8:
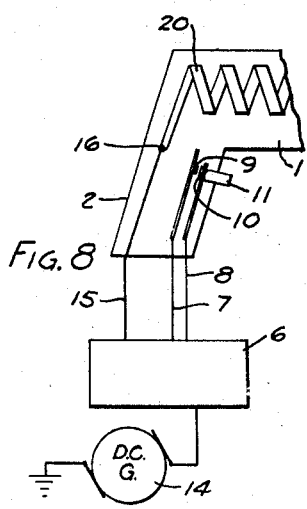
Fig. 8 is a diagrammatic view illustrating the electrical arrangement.

The welding tool shown herein as being one which may be employed in performing the welding method, is one which is very similar to the tool shown in the T. Nelson Patent No. 2,413,189 of December 12, 1946. This tool, as shown at 1 in Fig. 1, is somewhat in the shape of a gun, having a hand grip portion 2 and a body or barrel portion 3. The tool is associated with electrical control and circuit means as diagrammatically illustrated in Fig. 8. A relay and timer mechanism are generally illustrated at 6. Conductors for alternating current 7 and 8 extend into the tool and have contacts 9 and 10 arranged to be engaged when the operator depresses a trigger member 11. Associated with the timer mechanism is a source 14 of direct current and a conductor for direct current 15 extends into the tool to a terminal 16. The direct current source has a ground, as shown in Figure 8, and as illustrated in Fig. 1, the underlying work piece $W^1$ is grounded. The exposed work piece is illustrated at $W^2$. The timer and relay mechanism generally illustrated at 6 is an electrical arrangement known to those versed in the art and such a system is shown in detail in the above mentioned Nelson patent.

The body of the tool or gun is preferably made of suitable dielectric and mounted in the breach end thereof is a solenoid having windings 20, one end of which is connected to the terminal 16 as indicated. The other end of the winding or coil 20 is connected to a flexible conductor 21. There is a hollow fixed core section 22 and a movable core section or armature 23. A coil spring 24 normally urges the shiftable core 23 to the right as Fig. 1 is viewed and attached to the movable core 23 is a rod 24'. This rod extends through a sleeve 26 and it has a knob or enlargement 27 on its exposed end.

Figure 5:
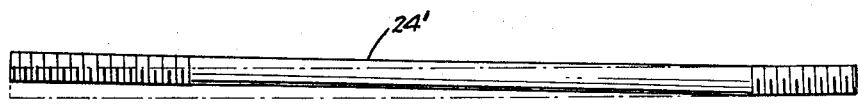
Fig. 5 is a detailed view of a locking rod showing how the same is deformed or bent.

The rod 24' is formed or bent out of a straight line condition, as shown in Fig. 5. The dotted line illustration in Fig. 5 shows a normal straight condition whereas the full line position shows the normal condition of the rod. As a result, the rod is biased so that its outer end tends to shift laterally to an off center position. The sleeve 26 holds the rod substantially on center as shown in Fig. 1 but when the movable electrode 23 is retracted, thus shifting the knob 27 out of the sleeve 26, the portion 28 of the knob catches on the outside face of the sleeve and thus locks the electrode 23 in its retracted position.

There is a fixed partition or wall member 30 in the barrel of the tool and slidably mounted therein is the electrode carrier 31. This electrode carrier has a head portion 32 against which a spring 33 acts to project the carrier, the spring reacting against the wall 30. The carrier has an exterior portion 35 arranged to receive and support the electrode 36. This electrode is advantageously in the form of a suitable carbon rod since carbon appears to provide a reducing atmosphere within the ferrule or shielding device 60 and in the vicinity of the weld metal.

Secured to the movable core 23, is a link 40 having a part 41 fastened to the core by a screw as shown and a hook portion 43. This hook portion engages behind a washer member 44 through which the carrier 31 loosely extends. A relatively light coil spring 45 is positioned between the washer and the portion 41 of the link. Substantially opposite the hook 41 is a fulcrum abutment 47 against which the washer seats. It will be seen that the washer is held normally perpendicular to the axis of the holder 31 with the result that the holder can readily slide back and forth through the washer. When the movable core 23 shifts to the left, however, the hook 43 engages the washer, causes it to fulcrum about the abutment 47 and thus the washer is tilted and its central aperture engages and grips the holder 31 and retracts the same. Thus the washer and related parts constitutes a clutch.

The flexible conductor 21 is advantageously fashioned into a loop as shown and its opposite end is connected to a coil 50. This may be done by means of a ring 51 to which the conductor 21 is connected and which is in engagement with an end convolution of the coil 50. The opposite end of the coil 50 is in engagement with a conductor 52, in turn, in electrical connection with the end portion 35 of the electrode carrier. The coil 50 and the coil 20 are preferably embedded in a suitable dielectrical material.

Figure 6:
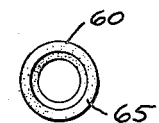
Fig. 6 is a plan view of the shielding or confining ferrule.

The tool is provided with a suitable foot 55 having an aperture through which the electrode extends. This foot is carried by a rod 56 slidably and non-rotatably mounted in a supporting member 57 carried by the body of the tool and which may be held adjusted as to its position by a thumb screw 58. The foot is arranged to receive a shielding device or ferrule 60 in its aperture so that the electrode is slidable therein. This ferrule has a relatively small end 61 arranged to be received and engaged by the foot. For this purpose, a spring metal collar or gripping device 62 may be applied to the foot for frictionally gripping the small end of the ferrule. The opposite end of the ferrule is somewhat enlarged to provide a cavity or space 64 which becomes a closed chamber when the ferrule is applied to the work piece as shown in Figs. 1 and 3. This shielding ferrule is preferably of a heat resisting ceramic material. The enlarged end of the ferrule as shown in Fig. 6 preferably has a smooth end surface 65 for providing a surface to surface contact with the work piece to thus effectively enclose the space 64 from the ambient atmosphere. The size or area of the weld is controlled to some extent by the size of the ferrule.

When the tool is conditioned for application to work the movable core 23 is projected to the position shown in Fig. 1 by the spring 24; the clutch washer 44 is held in position as shown in Fig. 1 by the spring 45 and the electrode is projected by the spring 33. The electrode projects beyond the ferrule as shown in Fig. 4. When the tool is applied to the work, as shown in Fig. 1, and the operator exerts the necessary pressure thereon, the electrode is pushed inwardly against the action of spring 33. Thus, a good contact is made between the electrode and the work. The tool is held against the work and the location thereof is determined by the ferrule as the ferrule seats against the work. With the tool in this position, the operator actuates the trigger 11 to momentarily make a contact between elements 9 and 10. This, through the relay and timer establishes a direct current circuit through the conductor 15 to terminal 16, through coil 20, conductor 21, contact ring 51, coil 50, through the electrode holder thence through the electrode and to the work. Since the electrode is in contact with the work the current is immediately established and the solenoid coil 20 then retracts the movable core 23. In this action, the clutch washer 44 tilts and grips the holder 31 and the electrode 36 is retracted to a position as indicated in Fig. 3. The current having already been established, an electrical arc is drawn between the end of the electrode and the work. As the movable core 23 shifts to the left as Fig. 1 is viewed, the rod 24' shifts with it and the knob 27, when it moves out of the sleeve 26, shifts laterally as shown in Fig. 2 and thus locks the movable core and the electrode in retracted position. After the arc has been maintained for the desired and adjusted period of time the relay and time mechanism generally illustrated at 6 discontinues the direct current.

During the maintenance of the electrical arc metal of both work pieces immediately underlying the ferrule is heated to the requisite welding temperature. Since the ferrule immediately surrounds the end of the electrode and the critical surface of the work, thus maintaining the chamber 64 confined, the exposed weld metal is protected from the ambient atmosphere and a non-oxidizing condition is maintained within the chamber 64. Upon the cessation of the welding current the metal rapidly cools and a weld 70 unites the work pieces. This may be almost instantaneous in view of the fact that the heat in the concentrated area rapidly dissipates into the adjacent metal of the work. The tool may now be removed from the work. It is reset by the operator merely pushing the rod 27 laterally to allow the spring 24 to shift the movable core 23 back to the Fig. 1 position. This action releases the clutch washer 44 and the spring 33 again projects the electrode. The tool and the method may be used in a circuit with straight polarity, that is, where the electrode is negative and the work is positive and may also be used with reverse polarity, that is, where the electrode is positive and the work is negative. Good results have been obtained where the gun is used on straight polarity although, depending upon conditions, the desired weld results are obtained sometimes with reverse polarity. The use of reverse polarity is sometimes more desirable when welding non-ferrous metal.

Figure 9:
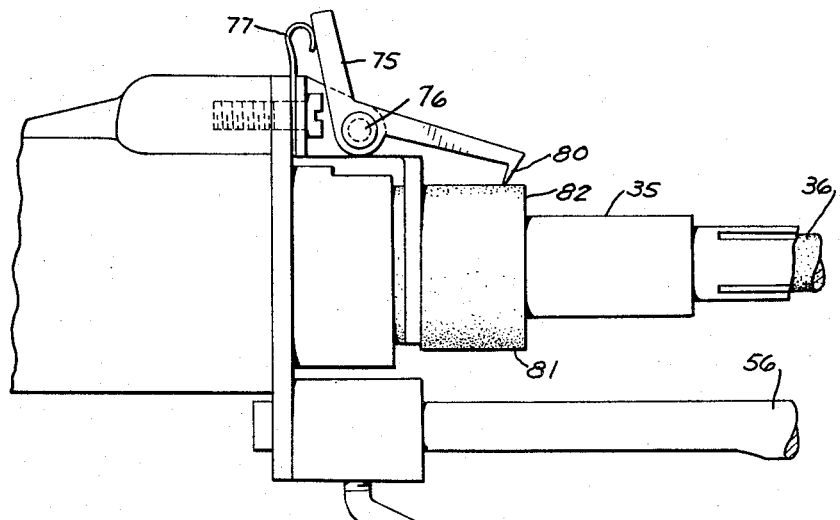
Fig. 9 is a partial view of a tool showing a modified form of electrode control.

A modified form of a control device or check for the electrode is shown in Fig. 9. In this form all of the parts above described may be the same except that the rod 24' and its related parts are eliminated. Instead, a detent member 75, somewhat in the form of a bell crank, is pivotally mounted on the tool as at 76 and acted upon by a spring 77. This detent lever has a hook portion 80 arranged to hook over the exposed end of the casing for the coil 50. This casing is illustrated at 81. It will be seen that when the electrode retracts the casing 81 retracts with it, and the spring causes the hook 80 to engage the outer wall 82 thus to hold the electrode retracted. After a weld is made, the operator releases the detent by swinging it on its pivot against the action of the spring 77.

Figure 7:
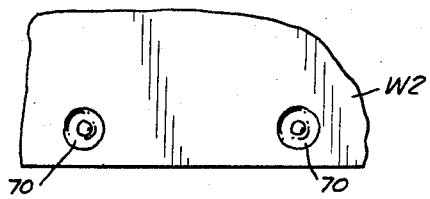
Fig. 7 is a plan view illustrating the nature of the welds on work pieces.

The carbon electrode being retracted and maintained out of contact with the welded area does not contaminate nor is it fused with the metal of the weld. The coil 50 through which the welding current passes generates a magnetic field about the welding arc tending to confine and stabilize the arc, and the polarity should be selected to stabilize the weld area in such a manner as to prevent spattering and to effect a smooth welded surface on the work piece $W^2$. The weld areas or spots may appear substantially as illustrated at 70 in Fig. 7. It has been found that an effective weld may be made between work pieces notwithstanding the presence of a fairly heavy scale on the surfaces thereof. The ceramic ferrule may have a life for the production of a fairly large number of welds, particularly if the ferrule is made of high temperature resistant material.

Figure 10:
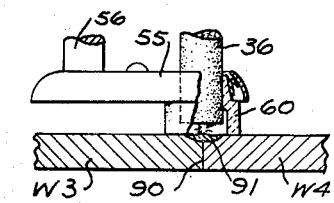
Fig. 10 is a view of work pieces tack welded together.

In Fig. 10 there are shown two work pieces $W^3$ and $W^4$ positioned with their edges in abutting relationship, the interfaces being illustrated at 90. These edges may be welded together as shown at 91. This may be termed a tack weld and the tool may be employed and used as above described with the electrode contacting the surfaces of the work pieces adjacent the interfaces and then the drawing of the arc to weld the interfaces together as indicated at 91. This tack weld need not necessarily have a depth equal to the thickness of the work pieces.

Figure 11:
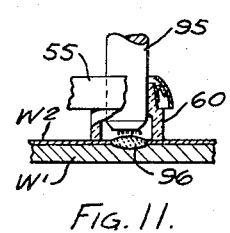
Fig. 11 is a view similar to Fig. 3 showing the use of the tool with a consumable electrode.

In Fig. 11 the work pieces may be similar to the work pieces $W^1$ and $W^2$ and are so identified. In this form, however, the tool is employed with a consumable electrode 95. The welding tool and the ferrule may be the same as otherwise described. In this form, the electrode is applied to the work and then withdrawn thus drawing the arc and some of the metal and the electrode "drips" into the weld metal of the work pieces 96. Thus, while the metal of the work pieces is supplemented by metal from the electrode, the added metal is incorporated into the weld while in molten form and since the metal of the work pieces is molten no uneven stresses or strains are set up which otherwise might establish an undesirable condition with cracks or the like.

Figure 12:
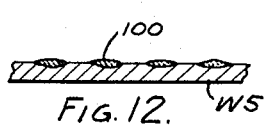
Fig. 12 is a view of a piece of work with weld spots distributed on one surface thereof thus producing a roughened surface.

The tool with a consumable electrode may be employed to produce work as shown in Fig. 12. Here the work piece $W^5$ is provided with a plurality or multiplicity of spots 100 produced, so to speak, by weld metal. The tool with a consumable electrode as, for example, the electrode 95 is applied to the work, the arc drawn, and the metal of the work rendered molten with some of the metal of the electrode entering and adding to the molten metal of the work piece. Upon solidification the spot is elevated, as shown, above the normal surface of the work piece. In this way, a roughened surface may be provided for any purpose as, for example, the production of a non-skid surface.

I claim:

1. A tool for the electric arc spot welding of superimposed metallic work pieces comprising, a body, an electrode carrier slidably mounted in the body for holding an electrode, a foot on the body for application to an exposed face of a work piece, yieldable means acting upon the electrode carrier to normally project an electrode the electrode carrier to normally project an electrode held thereby beyond the foot so that when the foot is applied to the work the electrode is pressed against the work, means for establishing an electrical circuit for the electrode, means operable for retracting the electrode relative to the foot, and catch means operable to hold the carrier retracted against the action of said yieldable means.

2. The tool substantially as described in claim 1 characterized in that the catch means is in the form of a rod movable with the slidable carrier, a guide element for the rod, an abutment member on the rod slidable in the guide element and shiftable out of the guide element as the carrier is retracted, the rod being biased to shift the abutment member laterally of the direction of extent of the rod, whereby the abutment catches on the guide means to hold the carrier retracted.

3. The tool substantially as described in claim 1 characterized in that there is a spring pressed detent on the body, and a shoulder on the carrier engageable with the detent upon the retraction of the carrier.

4. A tool for the electric arc spot welding of one or more metallic work pieces comprising, a body having an end adapted to be pressed against an exposed face of a work piece, an electrode carrier slidably mounted in the body for holding an electrode, yieldable means acting upon the electrode carrier to normally project an electrode held thereby beyond the end of the body so that when the end of the body is pressed against the work the electrode is pressed against the work, means for establishing an electrical circuit for the electrode, means operable for retracting the electrode carrier relative to the end of the body, and catch means operable to hold the carrier retracted against the action of said yieldable means.

5. The tool substantially as described in claim 4 characterized in that the catch means is in the form of a rod movable with the slidable carrier, a guide element for the rod, an abutment member on the rod slidable in the guide element and shiftable out of the guide element as the carrier is retracted, the rod being biased to shift the abutment member laterally of the direction of extent of the rod, whereby the abutment catches on the guide means to hold the carrier retracted.

6. The tool substantially as described in claim 4 characterized in that there is a spring pressed detent on the body, and a shoulder on the carrier engageable with the detent upon the retraction of the carrier.

7. A tool for drawing an arc between an electrode and a work piece comprising, a body, an electrode carrier slidably mounted on the body for holding an electrode, said body including foot means seatable against the exposed face of a work piece to position the body relative thereto, yieldable means acting upon the electrode carrier to normally project an electrode held thereby beyond the said foot means, so that when the foot means is seated against the work piece the electrode is pressed against the work piece, means for establishing an electrical circuit for the electrode, means operable for retracting the electrode relative to the foot means, and catch means operable to hold the carrier retracted against the action of said yieldable means a desired distance from the foot means, said catch means and said body having cooperating adjustment means permitting adjustment of said distance.

References Cited in the file of this patent

UNITED STATES PATENTS

| | | |
|---|---|---|
| 2,191,494 | Nelson | Feb. 29, 1940 |
| 2,413,189 | Nelson | Dec. 24, 1946 |
| 2,416,915 | Evans | Mar. 4, 1947 |